(12) United States Patent
Kashai et al.

(10) Patent No.: US 8,352,906 B2
(45) Date of Patent: Jan. 8, 2013

(54) METHOD, SYSTEM, AND COMPUTER PROGRAM PRODUCT FOR IMPLEMENTING EXTERNAL DOMAIN INDEPENDENT MODELING FRAMEWORK IN A SYSTEM DESIGN

(75) Inventors: Yaron Kashai, Sunnyvale, CA (US); Stavros Tripakis, Berkeley, CA (US); Felice Balarin, Berkeley, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1245 days.

(21) Appl. No.: 11/966,981

(22) Filed: Dec. 28, 2007

(65) Prior Publication Data

US 2009/0172632 A1 Jul. 2, 2009

(51) Int. Cl.
*G06F 9/44* (2006.01)
(52) U.S. Cl. ........ 717/105; 717/136; 717/139; 717/140; 717/168
(58) Field of Classification Search ........................ None
See application file for complete search history.

(56) References Cited

U.S. PATENT DOCUMENTS

| | | | |
|---|---|---|---|
| 5,596,744 A | 1/1997 | Dao et al. | |
| 6,023,578 A * | 2/2000 | Birsan et al. | 717/105 |
| 6,256,773 B1 * | 7/2001 | Bowman-Amuah | 717/121 |
| 6,292,830 B1 * | 9/2001 | Taylor et al. | 709/224 |
| 6,321,250 B1 | 11/2001 | Knape et al. | |
| 6,341,291 B1 | 1/2002 | Bentley et al. | |
| 6,615,166 B1 * | 9/2003 | Guheen et al. | 703/27 |
| 6,845,383 B1 | 1/2005 | Kraenzel et al. | |
| 6,920,486 B2 | 7/2005 | Kiilskinen | |
| 6,973,640 B2 * | 12/2005 | Little et al. | 717/106 |
| 7,096,454 B2 * | 8/2006 | Damm et al. | 717/105 |
| 7,320,120 B2 * | 1/2008 | Rajarajan et al. | 717/104 |
| 7,464,366 B2 * | 12/2008 | Shukla et al. | 717/100 |
| 7,707,566 B2 * | 4/2010 | Grover et al. | 717/148 |
| 7,895,156 B2 | 2/2011 | Bracha | |
| 2001/0025299 A1 | 9/2001 | Chang et al. | |

(Continued)

FOREIGN PATENT DOCUMENTS

WO 02075539 9/2002

OTHER PUBLICATIONS

A framework for modelling and simulating data flows in distributed computing systems, author: von Praun, C., source: IEEE, dated: 1998.*

(Continued)

*Primary Examiner* — Chameli Das
(74) *Attorney, Agent, or Firm* — Vista IP Law Group, LLP

(57) ABSTRACT

Disclosed are a method, system, and computer program product for implementing external domain independent modeling framework in a system design. In some embodiments, the method or system comprises importing an external model in an external format into the framework while substantially preserving some or all of the interpretation of the external model, determining a internal common representation for the external model within the framework, and displaying or storing the internal common representation in a tangible computer readable medium. In some embodiments, the method or system further comprises validating the accuracy of the internal common representation, determining an analysis or transformation capability for the framework, or outputting a first output model in a second external format. In various embodiments, the method or system requires no external tool compliance.

33 Claims, 9 Drawing Sheets

U.S. PATENT DOCUMENTS

| | | | |
|---|---|---|---|
| 2002/0059299 A1* | 5/2002 | Spaey | 707/104.1 |
| 2002/0169658 A1* | 11/2002 | Adler | 705/10 |
| 2002/0174180 A1 | 11/2002 | Brown et al. | |
| 2003/0009603 A1 | 1/2003 | Ruths et al. | |
| 2003/0023953 A1* | 1/2003 | Lucassen et al. | 717/106 |
| 2003/0233385 A1* | 12/2003 | Srinivasa et al. | 709/1 |
| 2003/0233431 A1* | 12/2003 | Reddy et al. | 709/221 |
| 2004/0054711 A1 | 3/2004 | Multer | |
| 2005/0033777 A1 | 2/2005 | Moraes et al. | |
| 2005/0102364 A1 | 5/2005 | Ozzie et al. | |
| 2005/0235274 A1* | 10/2005 | Mamou et al. | 717/136 |
| 2005/0289508 A1* | 12/2005 | Illowsky et al. | 717/106 |
| 2007/0260475 A1 | 11/2007 | Bhanote | |
| 2007/0288885 A1* | 12/2007 | Brunel et al. | 717/104 |
| 2008/0082959 A1* | 4/2008 | Fowler | 717/104 |
| 2009/0172632 A1 | 7/2009 | Kashai et al. | |
| 2009/0281648 A1 | 11/2009 | Gotou et al. | |

OTHER PUBLICATIONS

A process modelling framework: capturing key aspects of organisational behaviour, author: Mcrath, G.M source: IEEE, dated: 1997.*

Notice of Allowance dated Oct. 12, 2010 for U.S. Appl. No. 11/966,985.

Di Wu et al. "A framework for fast 3D solid model exchange in integrated design environment", Computers in Industry 56 (2005) 289-304.

Chi-Leung Fung et al. MOCS: an Object-Oriented Programming Model for Multimedia Object Communication and Synchronization, 1994 IEEE, pp. 494-501.

Non-Final Office Action dated May 12, 2010 for U.S. Appl. No. 11/966,985.

Wang Chao et al.Data fusion, the core technology for future on-board data process system, published 2002 conference proceedings p. 1-7.

Matthew Hause et al. "The SysML Modelling Language", Fifth European Systems Engineering Conference, Sep. 18-20, 2006, 12 pages.

Xiaojing Yuan, et al. "Real-Time Sensor Fusion Framework for Distributed Intelligent Sensors", 2002, American Association for Artificial Intelligence 6 pages.

Karsai et al. "Model-Integrated Development of Embedded Software" Proceedings of the IEEE, vol. 91, No. 1 Jan. 2003, pp. 145-164.

* cited by examiner

METHOD, SYSTEM, AND COMPUTER PROGRAM PRODUCT FOR IMPLEMENTING EXTERNAL DOMAIN INDEPENDENT MODELING FRAMEWORK IN A SYSTEM DESIGN

CROSS-REFERENCE TO RELATED APPLICATION(S)

The present application is related to U.S. patent application Ser. No. 11/966,985, entitled "METHOD, SYSTEM, AND COMPUTER PROGRAM PRODUCT FOR IMPLEMENTING A MODEL EXCHANGE FRAMEWORK", filed on Dec. 28, 2007, which is hereby incorporated by reference in its entirety.

BACKGROUND

Modem systems complexity is far greater than the capacity of any single individual. A typical system, such as big as an aircraft or as small as a cell-phone, is designed by teams of specialists in some concurrent form. Such teams may include concept engineering, system architects, hardware, software and mechanical engineering teams, manufacturing, reliability, and testing and field service experts among others. Each specialist team typically has its own workflow and set of tools. Furthermore, portions of the design process are often outsourced, creating a situation where the various specialists are geographically dispersed and are employed by different companies.

All these teams of specialists need to have a consistent and coherent view of the requirements, the design and the work plans. Design concerns typically cut across multiple disciplines. Consider for example an aircraft design case where the customer requests a particular feature, such as an entertainment sub-system, to be installed. This request for a particular feature may, however, impact power requirements, alter the weight, require additional software, hardware, and mechanical interfaces, and pose new manufacturing, reliability and field service challenges. Because of this interdependency, a design change by any one specialist typically perturbs the design of the whole system.

For the design to converge quickly, each specialist needs to understand the effects of a design change on the overall system and needs to communicate the change in unambiguous terms to the rest of the design team. This need is not met by today's design environment for several reasons. For example, the specification, architecture, and planning information is typically distributed as text documents and engineering drafts. Such documents are open to interpretation, often subjective, and may contain ambiguities and contradictions. Moreover, formal engineering models are domain specific and are not shared between specialists. The software team, for example, does not have the tools or the expertise to decipher the hardware design in order to detect a change in the software/hardware interface. Information in the form of either documents or formal models is often not shared on line because of lacking IT infrastructure or organizational issues such as mutual distrust between competing vendors for example. Hence critical changes are not propagated in a timely manner.

As a result of these deficiencies, the design process becomes much longer, problems are uncovered at the tail end of the process at integration phase. Recovery is very costly and the resulting design is sub-optimal and often misses some of its goals in terms of target market window, cost, reliability or feature set.

Furthermore, the lack of architecture, structures, and standards for system design and system engineering in general constitutes a major obstacle for the development of systems and often cause significant waste in resources and time which in turn negatively impact the time to market and therefore profitability due to problems in integration of various parts of the system. For example, the lack of architecture, structures, and standards for Electronic System Level (ESL) design and system engineering in general is a major obstacle for the development of automation tools.

What may often worsen the above problems is that a diverse set of engineering tools are used in the process of system design, where each domain specialist is using a particular tool. Engineering tools typically represent a partial model of the design. Such models are formal in some sense—they can execute, emulate, or simulate on a computer, or have some well understood mathematical foundation. Some examples of this diverse set of engineering tools comprise, for example, SysML tools, such as Rhapsody®, which are used by system engineers to capture an abstract functional description of the design, Simulink® which is used by DSP, control, and algorithm designers to capture computational aspects of system components, reliability analysis tools, such as Relex®, which are used by reliability engineers to capture system possible failure modes and reliability predictions, structural modeling tools, such as Pro-Engineer® and SolidWorks®, which are used to model and construct the structural elements of a system, and analysis tools, such as ANSYS® and Abacus®, which are used to numerically analyze the mechanical and electromagnetic aspects of a system.

Such engineering tools can typically export their internal models to a domain specific format, often as a computer file. The formats tend to be all different, as are the underlying semantics of the different models, which make the sharing of information among various design teams and specialists even more difficult. Building on the examples above, the structural information captured in a SysML model is required for the reliability analysis process. The assumptions about input/output relationships in a control algorithm design must be consistent with the SysML representation of communication between components. Furthermore, certain properties of the overall system can not be observed in any of the design tools because they may constitute emergent properties that only show up at the full system level. For example, two control algorithms that operate flawlessly when observed independently may nonetheless oscillate due to a non-obvious feedback loop when these two control algorithms are coupled together using, for example, the system level communication model.

The conventional approaches to address the above problems have their own drawbacks. For example, Metropolis® introduces the concept of meta-modeling for system level design and focuses on a refinement methodology through the mapping of functionality to architecture in the presence of constraints. Nonetheless, Metropolis® does not address the bridging of semantics between different design tools. As another example, SPEEDS (SPEculative and Exploratory Design Systems Engineering) is targeting model exchange between tools, by virtue of each tool adhering to a common semantic framework. This is in contrast with the current invention which makes no assumptions on external tool compliance. Moreover, Model Integrated Computing (MIC) focuses on integrating multiple domain specific tools by generating tool exchange formats from a common semantic framework. These current approaches either fail to address the semantics bridging or require external tool compliance by imposing specific formats or semantics on external tools, and thus it may not be practical to adjust or replace the complete tool chains used in system designs given the commercial setting with so many existing and deeply engrained tools that are currently used.

Thus, it is an objective of various embodiments of the present invention to provide a consistent framework containing design requirements, specifications and project management data is proposed as a way to break through this barrier while preserving semantics of various external models without requiring external tool compliance.

SUMMARY OF INVENTION

A consistent framework containing design requirements, specifications and project management data is proposed as a way to break through this barrier. Various embodiments of the invention, the method or the system for implementing external domain independent modeling framework serve as an inclusive repository for specification related information, while providing a semantic backbone for critical aspects and an anchor for system level design tools. Various embodiments of the invention read in and represent any external model or specification, regardless of whether the external model or specification is constructed or specified in a particular programming language or a set of semantics, and represent the external model or specification in an internal common modeling framework. Various embodiments of the invention also project part or all of the internal modeling framework to any external domain specific formats while preserving the model semantics.

BRIEF DESCRIPTION OF THE FIGURES

The accompanying drawings are included to provide a further understanding of the invention and, together with the Detailed Description, serve to explain the principles of the invention. Moreover, the drawings illustrate the design and utility of various embodiments of the invention. It should be noted that the figures are not drawn to scale and that elements of similar structures or functions are represented by like reference numerals throughout the figures. In order to better appreciate how the above-recited and other advantages and objects of various embodiments of the present inventions are obtained, a more particular description of various embodiments of the present inventions briefly described above will be rendered by reference to specific embodiments thereof, which are illustrated in the accompanying drawings. Understanding that these drawings depict only exemplary embodiments of the invention and are not therefore to be considered limiting of its scope, various embodiments of the invention will be described and explained with additional specificity and details through the use of the accompanying drawings in which.

DETAILED DESCRIPTION

Figure 1:
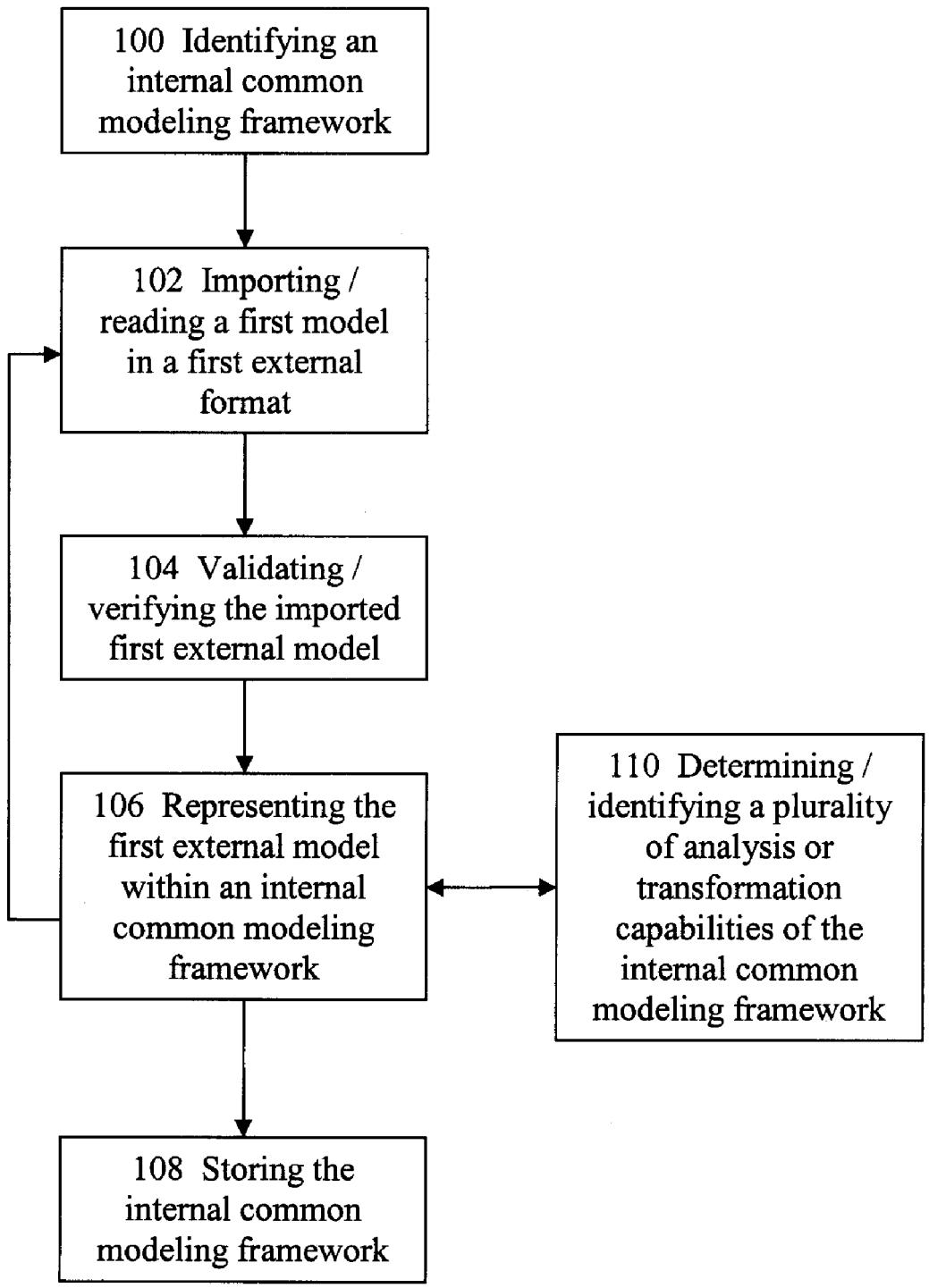
FIG. 1 illustrates a high level block diagram of a method or system for implementing external domain independent modeling framework in system designs for some embodiments of the invention.

A detailed description of one or more examples is provided below along with accompanying figures. The detailed description is provided in connection with such examples, but is not limited to any such particular examples. Numerous specific details are set forth in the following description in order to provide a thorough understanding of various embodiments of the subject matters of the invention. These specific details are provided for illustrative purposes and the described techniques may be practiced according to the claims without some or all of these specific details. For example, some embodiments described below refer to various methods or systems for implementing the external domain independent modeling framework in a single server environment for illustrative purposes and thus do not intend to limit the application of the invention to such a single server environment and should not be limited as such. For the purpose of clarity, technical material that is known in the technical fields related to the examples has not been described in detail to avoid unnecessarily obscuring the description.

Various embodiments of the invention are generally directed to a method, system, and computer program product for providing a consistent framework containing design requirements, specifications and project management data for system design. In other words, this invention addresses the problem of specification ambiguity and domain specific models, by enabling the exchange of formal engineering models between different domain experts. Various embodiments of the invention achieve various objectives without requiring any external design tool compliance. That is, various embodiments of the invention achieve the objectives without requiring any of formal engineering models to be directly or indirectly coded or modeled in or with a particular programming language or semantics.

The method or system for implementing external domain independent modeling framework as presented in various embodiments of the invention facilitate sharing of formal design models by overcoming the semantic gap that separates the various domain specific models. The method or system in some embodiments of the invention has multiple input compilers where each compiler is capable of reading in a specific format, and extracting the model represented in that format. Note that the term compiler is used in the sense that it transforms one set of symbols or references to another by following a set of syntactic and/or semantic rules. The extracted model is then represented internally within an internal common semantic framework where analysis and transformation functions can be applied. Also note that the internal common semantic framework, in one embodiment of the invention, constitutes a reusable design structure consisting of abstract and concrete object classes that assist in building applications. In some embodiments of the invention, the internal common modeling framework may output any part or all of its model by projecting from the internal model to an external representation of a particular format.

Some embodiments of the invention import or read models or specifications in various formats, including third party languages such as Simulink, Spirit, and SysML. These various models or specifications may even include domain specific models constructed or specified in one or more specific programming languages or semantics. Various embodiments of the invention represent information contained in these various formats internally using one or more semantic frameworks called aspects such as structures, functions, project planning, etc. Several embodiments of the invention further facilitate aspect manipulation such as composition or consistency checking as well as exporting these aspects into various external formats. Moreover, some embodiments of the invention may serve as an interface to document based systems such as requirement tracking and computer aided software engineering (CASE) tools. Some embodiments of the invention also promote system level model based designs by tying together heterogeneous models and adding automation on top.

With various embodiments of the invention as presented herein, these models may be shared between stakeholders and supporting change management and change impact analysis. The method or system for implementing external domain independent modeling framework in system design may also be analyzed in a system wide framework and verified for consistency in some embodiments of the invention. Moreover, in some embodiments of the invention, these models in the method or the system may be executed in a heterogeneous distributed environment, as well as pieces synthesized into design artifacts.

Referring to FIG. 1 which illustrates a high level block diagram of a method or system for implementing external domain independent modeling framework in system designs in some embodiments of the invention. At 100, the method or the system in some embodiments of the invention identifies an internal common modeling framework. At 102, the method or system imports a first external model in a first external format of a system design in some embodiments of the invention. In some embodiments, the method or the system identifies and stores the imported first external model in a repository which is devised to store some or all imported external models. The first external model may be created by an external tool in any particular format. Moreover, in one embodiment of the invention, the first external model is created by a domain specific external tool in a particular domain specific format.

In one embodiment, the first external model may comprise a formal model in the sense that the model represents certain aspects of the engineering artifact and its environment and/or is suitable for formal reasoning or verification about the properties of the system, and for deriving and generating a portion of the implementation. In another embodiment, the first external model may comprise one or more hardware architectural aspects which represent the hardware components used in the model and describe their structures and characterizes their properties at a particular abstraction level which renders the first external model suitable for other design activities such as verification or validation of the design and/or configuration(s) of the design. Such hardware architectural aspects may comprise, for example, geometric information, material information, processing power, and/or throughput of communication links at a particular abstraction level.

In addition or in the alternative, the first external model may comprise one or more software aspects which represent the software components and/or run-time components, describe their structures, and characterize their properties and correlations. Such software aspects may comprise, for example, the input/output channels of various software modules. Moreover, the first external model may comprise, in addition or in the alternative, one or more environment aspects which represent various assumptions and/or constraints about the system's environment(s). Such environment aspects may comprise, for example, sampling frequencies required for each of the input channels.

The first external model may be in any format that fits a particular purpose or objective during the design of the system. In one embodiment, the first external model may be in a simple textual format. In another embodiment, the first external model may be stored in a data structure. In another embodiment, the first external model may be stored in a persistent relational or non-relational database. In another embodiment, the first external model may be in a proprietary format for some proprietary applications. In another embodiment, the first external model may be in a particular format comprising a combination of any of the above.

In some embodiments of the invention, the method or the system validates, verifies, qualifies, and/or otherwise normalizes the imported first external model at 104. For example, in some embodiments of the invention, the method or the system performs a validation or verification suite which comprises a set of tests that measure compliance with a standard, such as a standard definition of the language used in constructing, determining, identifying, or representing the first external model and/or the language used in importing the first external model, to verify or validate the accuracy of the imported first external model. The validation or verification suite may comprise a set of criteria to verify or validate whether the imported first external model complies with the requirements and/or specification of the system under design. In addition or in the alternative, the method or the system performs a normalization operation to adjust the floating-point number system used in the first external model to that of the internal common modeling framework in some embodiments of the invention.

At 106, the method or the system determines an internal common representation to represent the first external model together with all or substantially all of the other external models, if any, in a uniform or common manner so some or all external models are represented in a uniform or common representation within an internal common modeling framework while preserving the semantics of the first external model within the internal common modeling framework. In the alternative, the method or the system updates an existing internal common modeling framework. Note that, in various embodiments of the invention, two representations of two models are considered uniform or common where the method or the system interprets or comprehends the two representations of the two models regardless of their respective external domains or their respective external sources. In various embodiments of the invention, the terms "interpret" and "comprehend" are used interchangeably, and each comprises, depending upon where the method or the system is implemented, the action of executing, simulating, emulating, or analyzing by an external model or by an internal model within the internal common modeling framework. In various embodiments of the invention, the terms "interpretation" and "comprehension" are used interchangeably, and each comprises execution, simulation, emulation, or analysis of an external model or an internal model within the internal common modeling framework with respect to one or more aspects of the external model and/or the corresponding internal model within the internal common modeling framework. In some embodiments of the invention, the one or more aspects are pre-determined or pre-defined in the method or the system. The one or more aspects may comprise, for example but not limited to, the function(s), manner(s), or result(s) of the execution, simulation, emulation, or analysis. In various embodiments of the invention, interpreting or comprehending the external model(s) comprises executing, simulating, emulation, or analyzing the external model(s) by using formal and/or non-formal methods.

In various embodiments of the invention, the internal common modeling framework preserve all or substantially all of the semantics of the first external model in the first external format. That is, the internal common modeling framework preserves all or substantially all of the interpretation or comprehension of the first external model in its internal common representation and does not significantly or substantially change the meaning and behavior of these external models in the sense that the imported external models behave in substantially the same manner as the original external model in their respective external domains. In various embodiments of the invention, the method or the system preserves all or substantially all of the interpretation or comprehension of the first external model where the internal common representation of the first external model within the internal common modeling framework executes, simulates, analyzes, emulates, or performs the operations in substantially the same manner and produces substantially the same results as does the first external model. In addition or in the alternative, the method or the system, in one embodiment, updates the internal common modeling framework by refining or modifying the original external models in a manner so the imported external models still behave, execute, simulate, emulates, analyze, or perform various operations in the same manner as the original external models. In various embodiments of the invention, the method or the system preserves all or substantially all of the semantics of the external model(s) by preserving all or substantially all of the interpretation or comprehension of the external models throughout the entire compiling, importing, or reading in process for the external model(s). In various embodiments of the invention, interpreting or comprehending the external model(s) comprises executing, simulating, emulating, or analyzing the external model(s) by using formal and/or non-formal methods.

After the first external model is successfully imported and the internal common modeling framework is successfully constructed, determined, identified, or updated, the method or the system in some embodiments of the invention loops back to 102 and determines whether there are additional external models to be imported. Where the method or the system determines, in some embodiments of the invention, that there are additional external models to be imported into the internal common modeling framework, the method or the system recursively repeats actions 102 and 104 until some or all external models are imported.

For example, where the method or the system determines that there is a second external model to be imported, the method or the system imports the second external model at 102. Note that the second external model may be in the first external format or in a different second external format. In some embodiments, the method or the system identifies and stores the imported second external model in the repository which also stores the imported first external model. The second external model may be created, as the first external model, by an external tool in any particular format. Moreover, in one embodiment of the invention, the second external model is created by a domain specific external tool in a particular domain specific format.

Similarly, in one embodiment, the second external model may comprise a formal model. In another embodiment, the second external model may also comprise one or more hardware architectural aspects, one or more software aspects, one or more environment aspects, or combination thereof. Furthermore, the second external model may be in any format that fits a particular design purpose or design objective of the system. In one embodiment, the second external model may be in a simple textual format. In another embodiment, the second external model may be stored in a data structure. In another embodiment, the second external model may be stored in a persistent relational or non-relational database. In another embodiment, the second external model may be in a proprietary format for some proprietary applications. In another embodiment, the second external model may be in a particular format comprising a combination of any of the above.

Similarly, in some embodiments of the invention, the method or the system validates, verifies, qualifies, and/or normalizes the imported second external model at 104. At 106, the method or the system updates the internal common modeling framework to further represent the second external model internally together with the first external model in a uniform or common manner so all or substantially all of the external models are represented in a uniform or common representation within the internal common modeling framework. Note that this uniform or common representation of external models is done without requiring external tool compliance.

At 110, the method or the system in various embodiments may optionally determine or identify a plurality of analysis and/or transformation capabilities within the internal common modeling framework to further improve efficiency. In some embodiments, representing a plurality of models in a uniform or common representation within the internal common modeling framework enables the creation of uniform or common functions for the manipulation and analysis of models.

For example, in the case where it is important to establish the structural soundness, such as the interconnectivity rules, reference resolution, etc., of a plurality of external models each of which may have different structural constraints and may even be in different formats or languages, the method or the system may import these external models and create some uniform or common functions within the internal common modeling framework and then analyzes the structural soundness across all or substantially all external domains in one embodiment of the invention.

As another example where it is desired to determine the dynamic behavior of several external models in different external domains, each of these external models may have independent execution semantics, but once these models are imported into the internal common modeling framework, all or substantially all these external models in a uniform or common representation within the internal common modeling framework may be executed by virtue of executing the semantic primitives. As another example where it is desired to perform static analysis to determine, for example, critical timing and schedulability of several external models in different external modeling languages, and the rules for timing analysis differ for each external modeling language. But by importing the models into a uniform or common representation within the internal common modeling framework, the method or the system of the invention can carry out a system wide timing analysis across all or substantially all external domains in one embodiment of the invention.

In addition to or in the alternative, the internal common modeling framework comprises, in one embodiment of the invention, one or more modeling language which provides modeling capability within the internal common modeling framework. The modeling language may comprise, for example, semantics, visual and/or textual syntax, and/or certain processing modules to provide additional capabilities in addition to representing external models within the framework. For example, the internal common modeling framework may comprise, in one embodiment, some of the aforementioned items so as to provide additional capabilities to synthesize, analyze, integrate, test, and/or operate the system within the framework.

At 108, the method or the system in various embodiments of the invention stores the internal common modeling framework together with the uniform or common representation of the first external model in a tangible computer readable medium. Where the functions are created to provide analysis and/or transformation capabilities in some embodiments of the invention, the method or the system also stores such functions in a tangible computer readable medium.

In some embodiments of the invention, part or all of the method or the system may be implemented as an embedded software or an embedded system. In some embodiments of the invention, an embedded software comprises a computer software or firmware that integrates with the electronic circuit with which the embedded software is supplied. An embedded system comprises an electronic circuit which is embedded with some form of an embedded software and may further comprise hardware or mechanical components. In some embodiments of the invention, the embedded system is characterized by being programmable.

Figure 2:
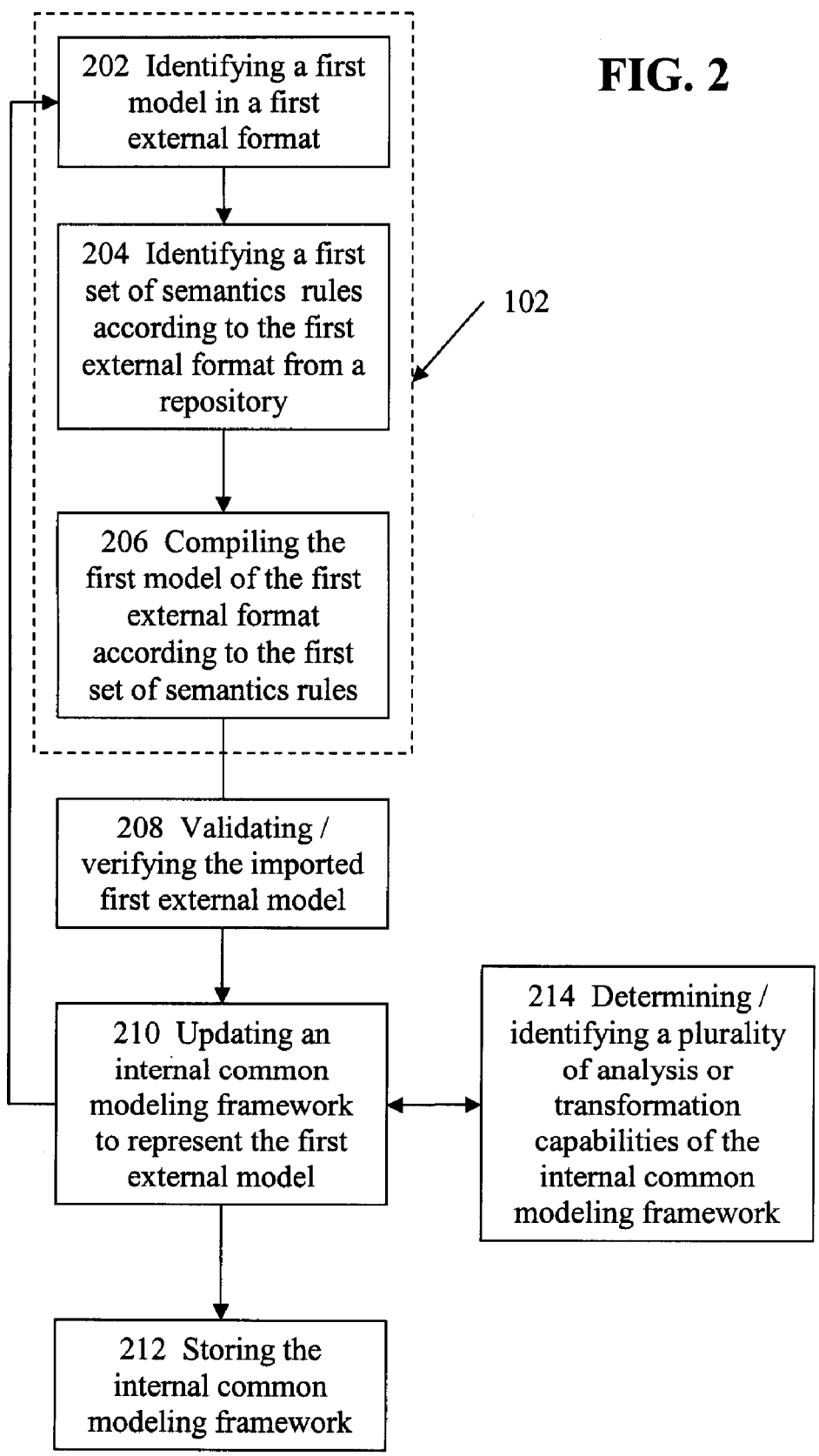
FIG. 2 illustrates further details of a method or system for implementing external domain independent modeling framework in system designs in some embodiments of the invention.

Referring to FIG. 2 which illustrates further details of a method or system for implementing external domain independent modeling framework in system designs in some embodiments of the invention.

At 202, the method or system identifies a first external model of a first external format of a part of a system design in some embodiments of the invention. The first external model may be created by an external tool in any particular format. In one embodiment of the invention, the first external model is created by a domain specific external tool in a particular domain specific format.

In one embodiment, the first external model may comprise a formal model in the sense that the model represents certain aspects of the engineering artifact and its environment and/or is suitable for formal reasoning or verification about the properties of the system, and for deriving and generating a portion of the implementation. In another embodiment, the first external model may comprise one or more hardware architectural aspects which represent the hardware components used in the model and describe their structures and characterizes their properties at a particular abstraction level which renders the first external model suitable for other design activities such as verification or validation of the design and/or configuration(s) of the design. Such hardware architectural aspects may comprise, for example, geometric information, material information, processing power, and/or throughput of communication links at a particular abstraction level.

In addition or in the alternative, the first external model may comprise one or more software aspects which represent the software components and/or run-time components, describe their structures, and characterize their properties and correlations. Such software aspects may comprise, for example, the input/output channels of various software modules. Moreover, the first external model may comprise, in addition or in the alternative, one or more environment aspects which represent various assumptions and/or constraints about the system's environment(s). Such environment aspects may comprise, for example, sampling frequencies required for each of the input channels.

The first external model may be in any format that fits a particular purpose or objective during the design of the system. In one embodiment, the first external model may be in a simple textual format. In another embodiment, the first external model may be stored in a data structure. In another embodiment, the first external model may be stored in a persistent relational or non-relational database. In another embodiment, the first external model may be in a proprietary format for some proprietary applications. In another embodiment, the first external model may be in a particular format comprising a combination of any of the above.

At 204, the method or the system of some embodiments of the invention identifies a first set of semantics rules according to the first external model in the first external format identified. In one embodiment of the invention, the first set of semantics rules define the relationships among words, symbols, statements, objects, ideas, situations, or other information contained in the first external model such that the words, symbols, statements, objects, ideas, situations, or other information convey certain meanings which conform to the design intent or objectives. In various embodiments of the invention, the first set of semantics rules enable the method or the system not only to be able to read, interpret, or import the first external model but also preserve the semantics as contained in the original first external model.

At 206, the method or the system of some embodiments of the invention compiles the first external model in a first external format according to the first set of semantics rules identified. In some embodiments of the invention, the method or system transforms, translates, or converts one set of symbols or references as contained in the first external model in certain semantics into a another set of symbols or references as contained in the internal common modeling framework. In some other embodiments of the invention, the method or system transforms, translates, or converts one set of symbols or references as contained in the first external model in certain semantics into another set of symbols or references a lower level as contained in the internal common modeling framework for purposes such as implementation of the imported first external model.

At 208, the method or the system of the invention validates, verifies, qualifies, and/or otherwise normalizes the compiled first external model. For example, in some embodiments of the invention, the method or the system performs a validation or verification suite which comprises a set of tests that measure compliance with a standard, such as a standard definition of the language used in constructing the first external model and/or the language used in importing the first external model, to verify or validate the accuracy of the imported first external model. The validation or verification suite may comprise a set of criteria to verify or validate whether the imported first external model complies with the requirements and/or specification of the system under design. In addition or in the alternative, the method or the system performs a normalization operation to adjust the floating-point number system used in the first external model to that of the internal common modeling framework in some embodiments of the invention.

At 210, the method or the system updates an internal common modeling framework which represents the first external model within the internal common modeling framework together with all or substantially all the other external models, if any, in a uniform or common manner so all or substantially all external models are represented in a uniform or common representation within the internal common modeling framework while preserving the semantics of the first external model within the internal common modeling framework.

In various embodiments of the invention, the internal common modeling framework preserve the semantics of the first external model in the first external format. That is, the internal common modeling framework does not change the meaning and behavior of these external models in the sense that the imported external models behave in the same manner as the original external model in their respective external domains.

In addition or in the alternative, the method or the system, in one embodiment, constructs, determines, identifies, or updates the internal common modeling framework by refining or modifying the original external models in a manner while preserving the semantics of the first external model within the internal common modeling framework. After the first external model is successfully imported and the internal common modeling framework is successfully constructed, determined, identified, or updated, the method or the system in some embodiments of the invention loops back to 202 and determines whether there are additional external models to be imported. Note that the second external model may be in the first external format or in a different second external format.

In some embodiments, the method or the system identifies and stores the imported second external model in the repository which also stores the imported first external model. The second external model may be created, as the first external model, by an external tool in any particular format. Moreover, in one embodiment of the invention, the second external model is created by a domain specific external tool in a particular domain specific format.

Similarly, in one embodiment, the second external model may be a formal model. In another embodiment, the second external model may also comprise one or more hardware architectural aspects, one or more software aspects, one or more environment aspects, or combination thereof. Furthermore, the second external model may be in any format that fits a particular design purpose or design objective of the system. In one embodiment, the second external model may be in a simple textual format. In another embodiment, the second external model may be stored in a data structure. In another embodiment, the second external model may be stored in a persistent relational or non-relational database. In another embodiment, the second external model may be in a proprietary format for some proprietary applications. In another embodiment, the second external model may be in a particular format comprising a combination of any of the above.

Similarly, in some embodiments of the invention, the method or the system validates, verifies, qualifies, and/or otherwise normalizes the imported second external model at 208. At 210, the method or the system updates the internal common modeling framework to further represent the second external model internally together with the first external model in a uniform or common manner so all or substantially all external models are represented in a uniform or common representation within the internal common modeling framework. Note that this uniform or common representation of external models is done without requiring external tool compliance.

At 212, the method or the system in various embodiments of the invention stores the internal common modeling framework together with the uniform or common representation of the first external model in a tangible computer readable medium. Where the functions are created to provide analysis and/or transformation capabilities in some embodiments of the invention, the method or the system also stores such functions in a tangible computer readable medium.

At 214, the method or the system in various embodiments may optionally determine or identify a plurality of analysis and/or transformation capabilities within the internal common modeling framework to further improve efficiency. In some embodiments, representing a plurality of models in a uniform or common representation within the internal common modeling framework enables the creation of uniform or common functions for the manipulation and analysis of models.

Figure 3:
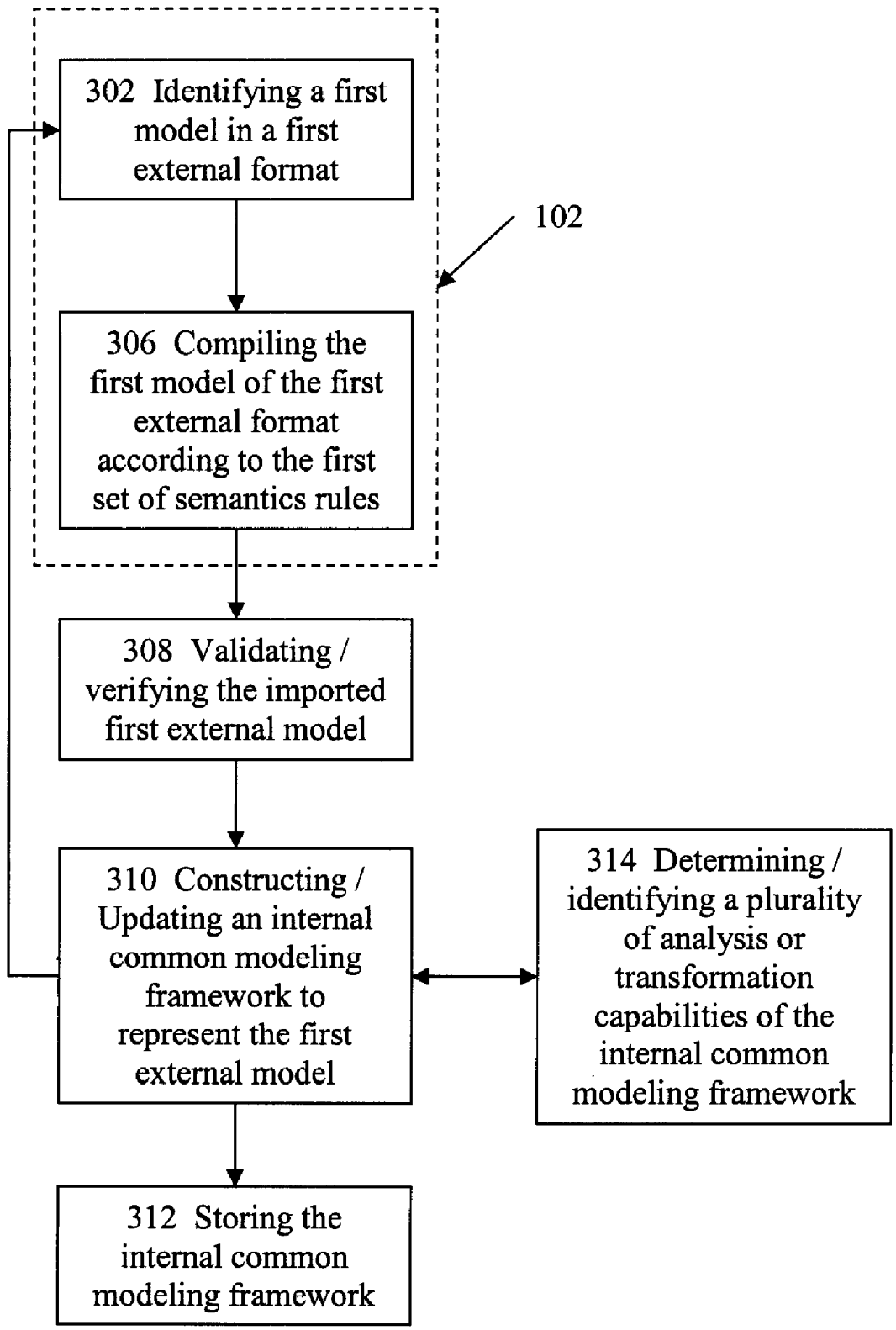
FIG. 3 illustrates further details of the importing the first external model of a method or system for implementing external domain independent modeling framework in system designs in some embodiments of the invention.

Referring to FIG. 3 which illustrates further details of the importing the first external model of a method or system for implementing external domain independent modeling framework in system designs in some embodiments of the invention.

At 302, the method or system identifies a first external model of a first external format of a part of a system design in some embodiments of the invention.

At 306, the method or the system of some embodiments of the invention compiles the first external model in a first external format according to the first set of semantics rules identified.

At 308, the method or the system of the invention validates, verifies, qualifies, and/or otherwise normalizes the compiled first external model.

At 310, the method or the system represents the first external model within an internal common modeling framework together with all or substantially all the other external models, if any, in a uniform or common manner so all or substantially all external models are represented in a uniform or common representation within the internal common modeling framework while preserving the semantics of the first external model within the internal common modeling framework. In the alternative, the method or the system updates an existing internal common modeling framework. In various embodiments of the invention, the internal common modeling framework preserve the semantics of the first external model as contained in the first external format. That is, the internal common modeling framework preserves the interpretation or comprehension of the first external model and does not change the meaning and behavior of these external models in the sense that the imported external models behave in the same manner as the original external model in their respective external domains. In various embodiments of the invention, the method or the system preserves the interpretation or comprehension of the first external model where the internal common representation of the first external model within the internal common modeling framework executes, simulates, emulates, analyzes, or performs the operations in the same manner and produces the same results as does the first external model.

In addition or in the alternative, the method or the system, in one embodiment, constructs, determines, identifies, or updates the internal common modeling framework by refining or modifying the semantics of the original external models in a manner so the imported external models still behave in the same way as the original. After the first external model is successfully imported and the internal common modeling framework is successfully constructed, determined, identified, or updated, the method or the system in some embodiments of the invention loops back to 302 and determines whether there are additional external models to be imported. Note that the second external model may be in the first external format or in a different second external format. In some embodiments, the method or the system identifies and stores the imported second external model in the repository which also stores the imported first external model. The second external model may be created, as the first external model, by an external tool in any particular format. Moreover, in one embodiment of the invention, the second external model is created by a domain specific external tool in a particular domain specific format.

At 312, the method or the system in various embodiments of the invention stores the internal common modeling framework together with the uniform or common representation of the first external model in a tangible computer readable medium. Where the functions are created to provide analysis and/or transformation capabilities in some embodiments of the invention, the method or the system also stores such functions in a tangible computer readable medium.

At 314, the method or the system in various embodiments may optionally determine or identify a plurality of analysis and/or transformation capabilities within the internal common modeling framework to further improve efficiency. In some embodiments, representing a plurality of models in a uniform or common representation within the internal common modeling framework enables the creation of uniform or common functions for the manipulation and analysis of models.

Figure 4:
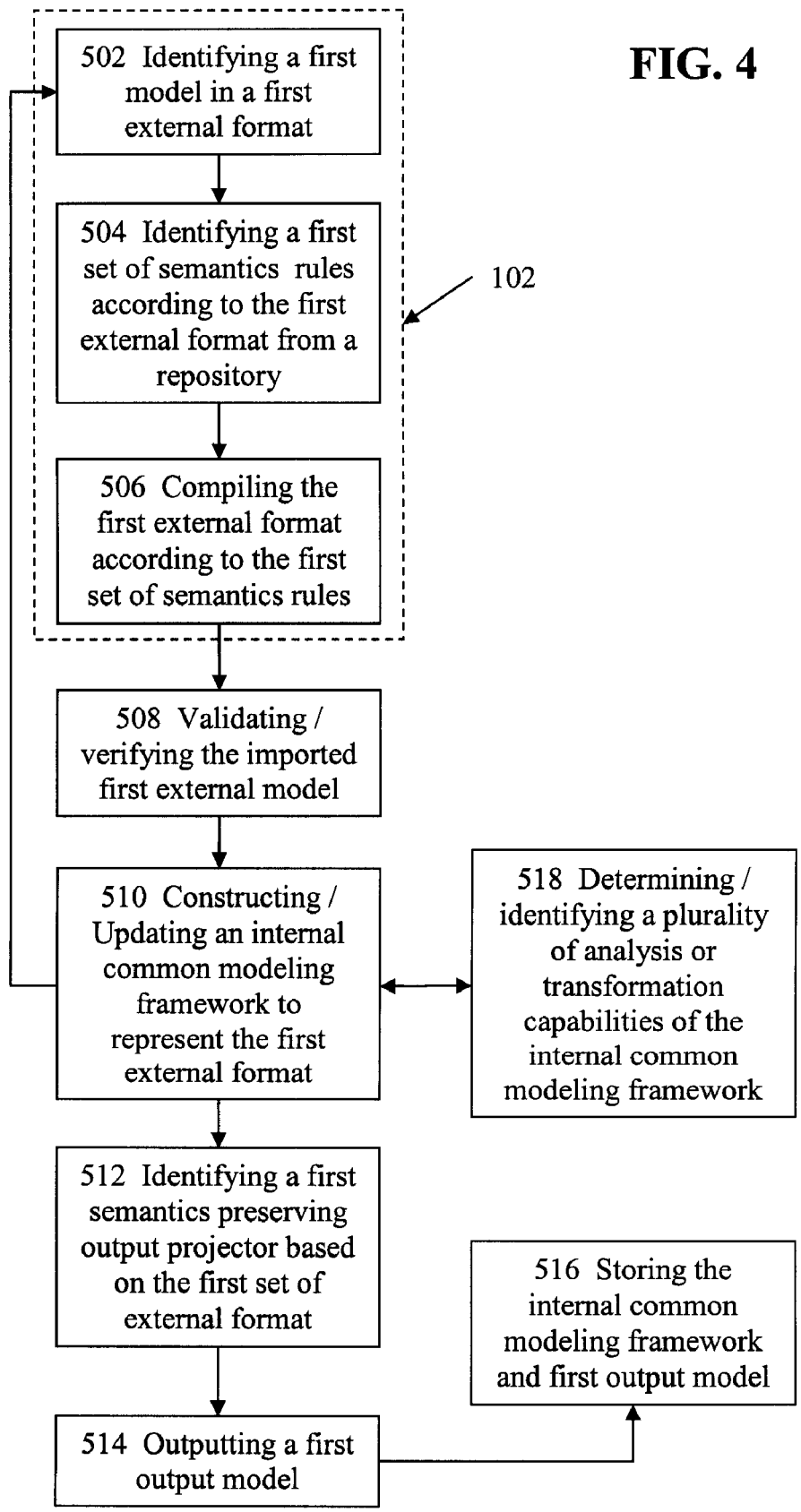
FIG. 4 illustrates more details of a method or system for implementing external domain independent modeling framework in system designs in some embodiments of the invention.

Referring to FIG. 4 which illustrates more details of a method or system for implementing external domain independent modeling framework in system designs in some embodiments of the invention.

At 502, the method or system identifies a first external model of a first external format of a part of a system design in some embodiments of the invention.

At 504, the method or the system of some embodiments of the invention identifies a first set of semantics rules according to the first external model in the first external format identified in some embodiments. In some other embodiments, the first set of semantics rules is pre-programmed into the method or the system according to the first external format.

At 506, the method or the system of some embodiments of the invention compiles the first external model in a first external format according to the first set of semantics rules identified.

At 508, the method or the system of the invention validates, verifies, qualifies, and/or otherwise normalizes the compiled first external model.

At 510, the method or the system represents the first external model within an internal common modeling framework together with all or substantially all the other external models, if any, in a uniform or common manner so all or substantially all external models are represented in a uniform or common representation within the internal common modeling framework while preserving the semantics of the first external model within the internal common modeling framework. In the alternative, the method or the system updates an existing internal common modeling framework. In various embodiments of the invention, the internal common modeling framework preserve the semantics of the first external model in the first external format. In addition or in the alternative, the method or the system, in one embodiment, constructs, determines, identifies, or updates the internal common modeling framework by refining or modifying the semantics of the original external models in a manner so the imported external models still behave in the same way as the original. After the first external model is successfully imported and the internal common modeling framework is successfully constructed, determined, identified, or updated, the method or the system in some embodiments of the invention loops back to 502 and determines whether there are additional external models to be imported.

At 512, the method or the system in some embodiments of the invention identifies a first semantics preserving output projector based on the first set of external format. In some other embodiments of the invention, the method or the system identifies a first semantics preserving output projector based on a second set of external format.

At 514, the method or the system in some embodiments of the invention outputs a first output model according to the first semantics preserving output projector previously identified. The first semantics preserving output projector preserves the semantics of the output model. That is, the first semantics preserving output projector outputs the first output model without changing the meaning and/or behavior of the output model. The determination of which semantics preserving output projector is to be identified at 512 is based upon the external format required for the output model. For example, where the first output model is required to be in the format of Simulink®, the first semantics preserving output projector outputs the first output model in the format of SystemC while preserving the semantics in the first output model.

At 516, the method or the system in various embodiments of the invention displays the internal common modeling framework together with the uniform or common internal common representation of the first external model or stores the internal common modeling framework together with the uniform or common internal common representation of the first external model in a tangible computer readable medium. Where the functions are created to provide analysis and/or transformation capabilities in some embodiments of the invention, the method or the system also stores such functions in a tangible computer readable medium.

At 518, the method or the system in various embodiments may optionally determine or identify a plurality of analysis and/or transformation capabilities within the internal common modeling framework to further improve efficiency. In some embodiments, representing a plurality of models in a uniform or common representation within the internal common modeling framework enables the creation of uniform or common functions or operations for the execution, simulation, emulation, manipulation, or analysis of models.

Figure 5:
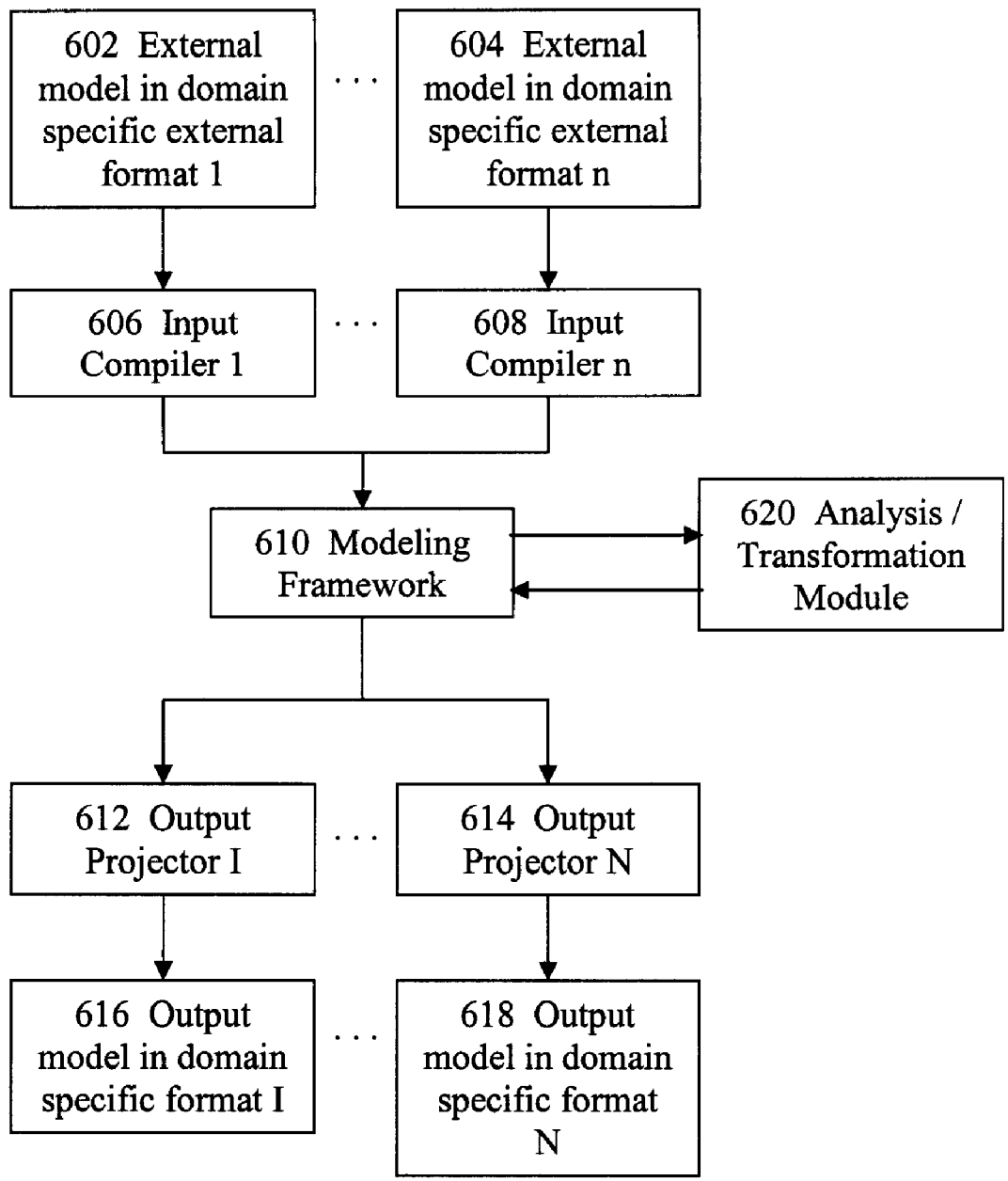
FIG. 5 illustrates a system for implementing external domain independent modeling framework in system designs.

Referring to FIG. 5 which illustrates a system for implementing external domain independent modeling framework in system designs.

The system comprises one or more input compilers, 602 and 604, corresponding respectively to one or more external models in one or more external formats, 606 and 608. For example, the input compiler 606 corresponds to the external model in an external format 1, 602, and the input compiler 608 corresponds to the external model in an external format 2, 604. The system further comprises the internal common modeling framework which represents the external models in a uniform or common representation within itself. The system may optionally comprise one or more output projectors, 612 and 614, which outputs part or all of the internal common representations of some or all models to one or more external formats, 616 and 618, while preserving the semantics of these internal common representations. For example, output projector 612 outputs part or all of the internal common modeling framework to an output model in external format I, 616, and output projector 614 outputs part or all of the internal common modeling framework to an output model in external format N, 618. The system may further optionally comprise an analysis and/or transformation module to provide additional analysis and/or transformation capabilities to the system.

In various embodiments of the invention, the method or the system outputs part or all of the internal common modeling framework while preserving the semantics of the internal common representations in the output model(s). That is, the internal common modeling framework preserves the interpretation or comprehension of the internal common representations of the models to be output and does not change the meaning and behavior of these external models in the sense that the output models behave in the same manner as the original internal common representation of models in their respective external domains. In various embodiments of the invention, the method or the system preserves the interpretation or comprehension of the first external model where the output model executes, simulates, emulates, analyzes, or performs the operations in the same manner and produces the same results as do the internal common representations of models.

Figure 6:
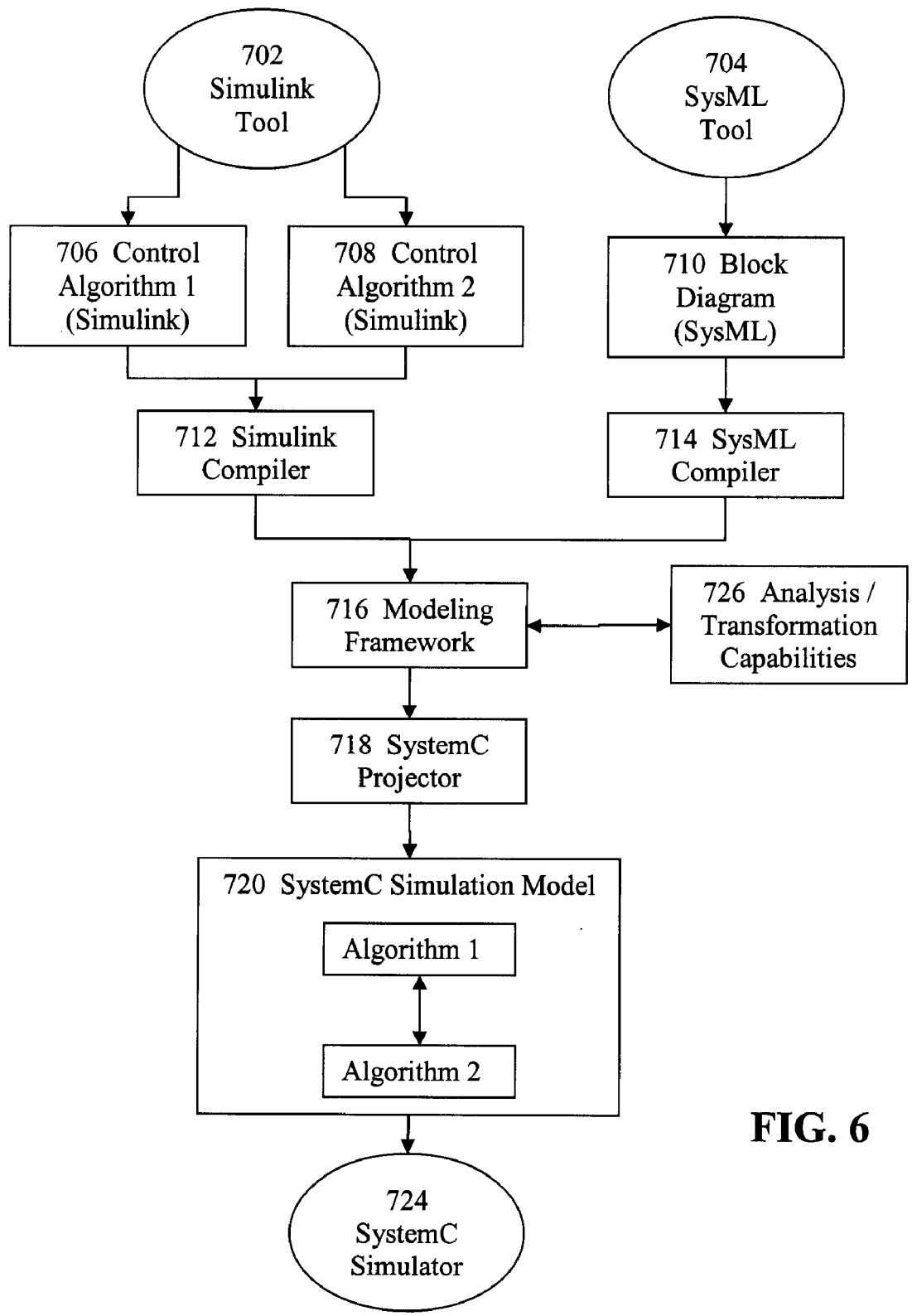
FIG. 6 illustrates an example of a method or system of implementing external domain independent modeling framework in system designs represented partly in SysML and partly in Simulink.

Referring to FIG. 6 which illustrates an example of a method or system of implementing external domain independent modeling framework in a system design represented partly in SysML, 702, which comprises control algorithm 1, 706, and control algorithm, 708, and provides an overall architecture and connectivity and partly in Simulink, 704, capturing specific algorithms, 710. These representations in SysML and Simulink are compiled by the respective Simulink compiler, 712, and SysML compiler, 714, into the internal common modeling framework, 716, where they are represented in a semantic-preserving uniform or common representation.

The system may optionally comprise analysis and or transformation capabilities, 726, to analyze and/or transform the model. Such analysis and/or transformation capabilities enable the model to be analyzed as a whole, for instance to determine the required invocation rate of each component, so that the system may execute, simulate, emulate, or analyze as a whole. The full system representation is projected out by the SystemC projector, 718, by generating a SystemC model, 720, to be simulated by the SystemC simulator, 724, again preserving the original semantics. Simulating the resulting model may reveal unexpected behavior due to the coupling of the control algorithm 1 and control 2 in the full system context.

Figure 7:
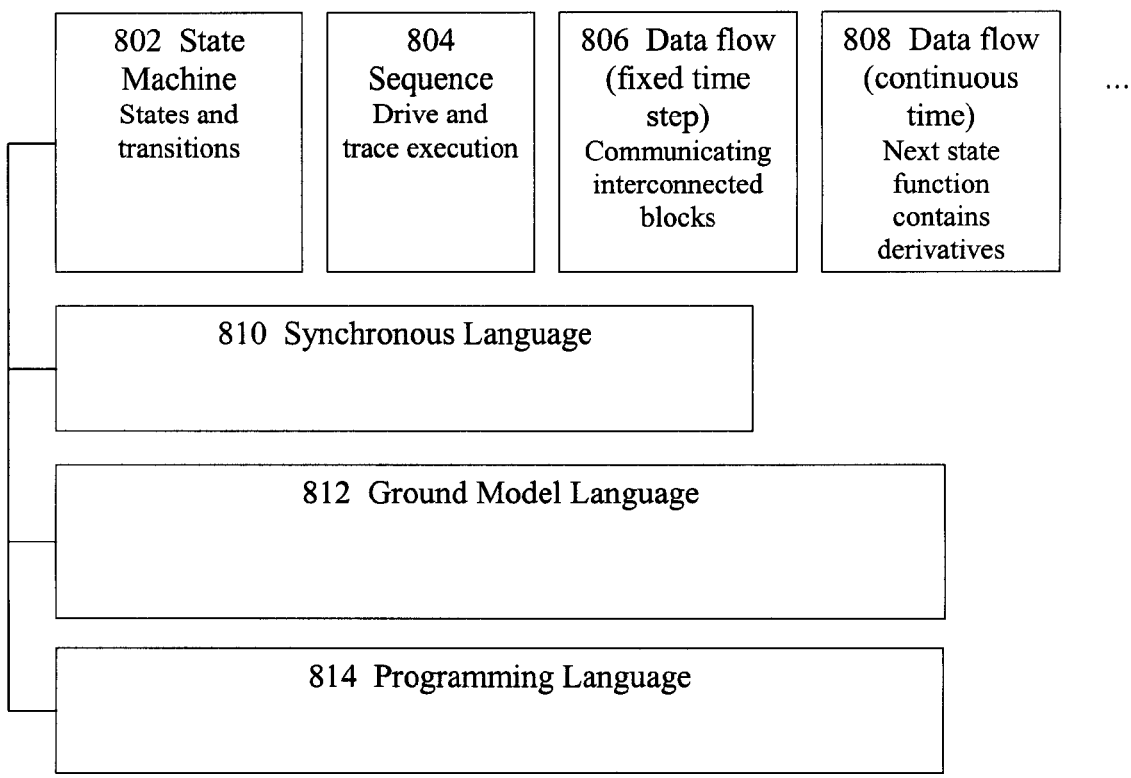
FIG. 7 illustrates exemplary languages used at different abstraction levels of method or system.

Referring to FIG. 7 which illustrates various levels of the internal common modeling framework and/or the processes which compiles, imports, or reads in an external model and represents the external model in a common or uniform representation within the internal common modeling framework. In various embodiments of the invention, the term "compile", "import", and "read in" are used interchangeably to mean transforming one set of symbols or references to another by following a set of syntactic and/or semantic rules.

At the lowest level, 814, the method or the system in some embodiments of the invention adopts various programming languages. The programming language is characterized by being an imperative, an object oriented, a modular, or a dynamic programming language. In some embodiments of the invention, the programming language constitutes a dynamic programming language in the sense that the models in these dynamic programming languages may be interpreted at run-time. In various embodiments of the invention, interpreting the model comprises executing, simulating, emulating, or analyzing the model by using formal and/or non-formal methods. These dynamic programming languages are also known as late-binding. In some other embodiments of the invention, the programming language constitutes a static programming language where the models in the programming languages may be interpreted at during compile-time. In one embodiment of the invention where an object oriented programming language is adopted at 814, the method or the system further adopts the reflective paradigm which adds self-optimization and/or improves program flexibility. In one embodiment of the invention, the method or the system adopts a Smalltalk based programming language.

At 812, the method or the system in some embodiments of the invention adopts one or more well defined ground model languages which are some form of general programming languages and are characterized by being capable of representing any models within the semantics and/or syntactics of these general programming languages while preserving the semantics of the models input into the ground model languages. In some embodiments of the invention, the ground model language at 812 comprises a process algebra based language, an abstract language, a declarative language. In some embodiments of the invention, the ground model language comprises a computing or a communicating operation which may be composed in parallel, in sequence, or in alternation.

In some embodiments of the invention at 810, the method or the system adopts a synchronous language which adds synchronization to a model which represented by a non-synchronous language in the modeling layer. For example, the method or the system in one embodiment of the invention will further compile an internal representation of a model which is first compiled by 808 which may be a non-synchronous language.

802, 804, 806, and 808 illustrate four exemplary languages on a modeling layer which may be used to internally represent their respective families of external models based upon the relevant semantics. For example, the language 802 may be used to internally represent an external model of state machine which describes the states and transitions of the system; the language 804 may be used to internally represent an external model describing drive and trace execution; the language 806 may be used to internally represent an external model which models the data flow at fixed time step(s) among communicating interconnected blocks; the language 808 may be used to internally represent an external model which models the data flow at continuous time describing the next state function that contains derivatives.

In various embodiments of the invention, the method or the system imports, compiles, or reads in various external models through invoking the appropriate and respective languages, such as 802, 804, 806, or 808, to internally represent these external models within the framework. Nonetheless, in some embodiments of the invention, these internally represented models, such as 802, 804, 806, or 808, may not have a uniform (or common) internal representation. In these embodiments of the invention, the method or the system may invoke 810 to further compile these internal models of 802, 804, 806, or 808 such that the compiled models are internally represented in a uniform or common representation.

Moreover, in some embodiments of the invention, the method or the system may identify the languages on the modeling layer, such as the ones used in 802, 804, 806, or 808, which contains some constructs to suitable to produce a uniform (or common) representation of external models of respective families. Note that, in various embodiments of the invention, two representations of two models are considered uniform or common where the method or the system can interpret or comprehend the two representations of the two models regardless of their respective external domains or respective external sources. In various embodiments of the invention, the terms "interpret" and "comprehend" are used interchangeably, and each comprises the action of executing, simulating, emulating, or analyzing by an external model or by an internal model within the internal common modeling framework. In various embodiments of the invention, the terms "interpretation" and "comprehension" are used interchangeably, and each comprises execution, simulation, emulation, or analysis of an external model or an internal model within the internal common modeling framework. In various embodiments of the invention, interpreting or comprehending the external model(s) comprises executing, simulating, emulating, or analyzing the external model(s) by using formal and/or non-formal methods.

Figure 8:
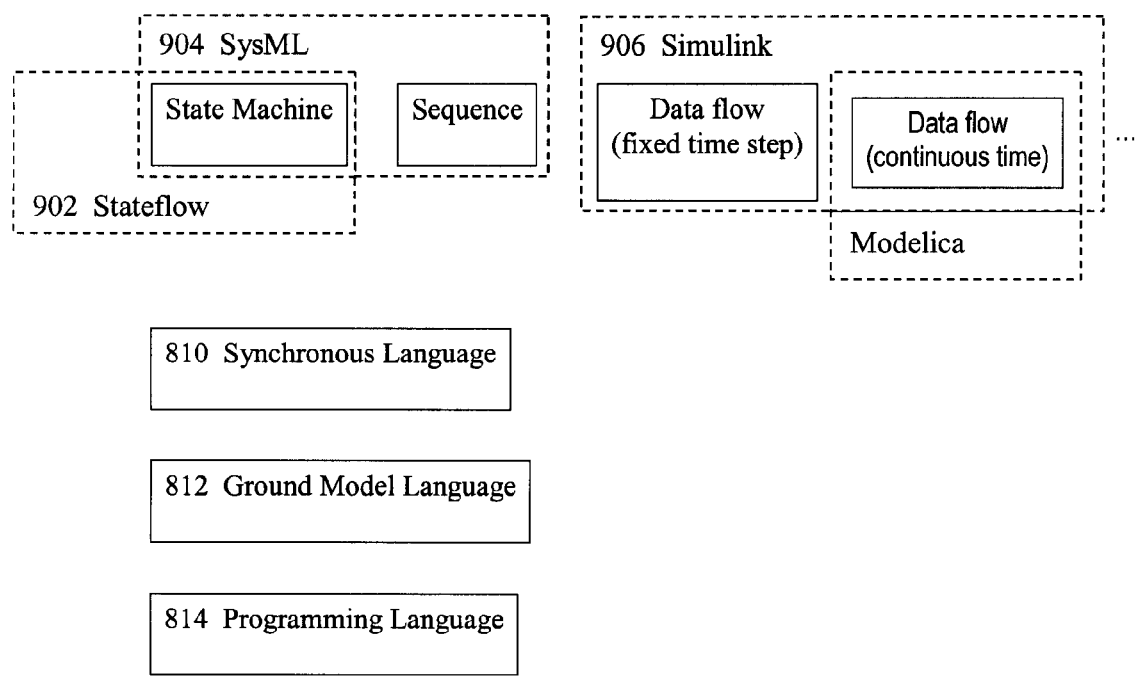
FIG. 8 illustrates some exemplary commercially available languages used in creating the external models as illustrated in FIG. 8.

Referring to FIG. 8 which illustrates some exemplary commercially available languages used in creating the external models as illustrated in 802, 804, 806, and 808 in FIG. 7. For example, Stateflow, 902, may be adopted in modeling the state machine. SysML, 904, may be adopted to model the state machine and the sequence. Simulink, 906, may be adopted to model the data flow at fixed time step and data flow in continuous time. The method or the system of various embodiments of the invention can accommodate all or substantially all these external models and internally represent these external models in a uniform or common representation within the internal common modeling framework without requiring any external tool compliance while preserving the respective semantics of each of the external models.

System Architecture Overview

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 9:
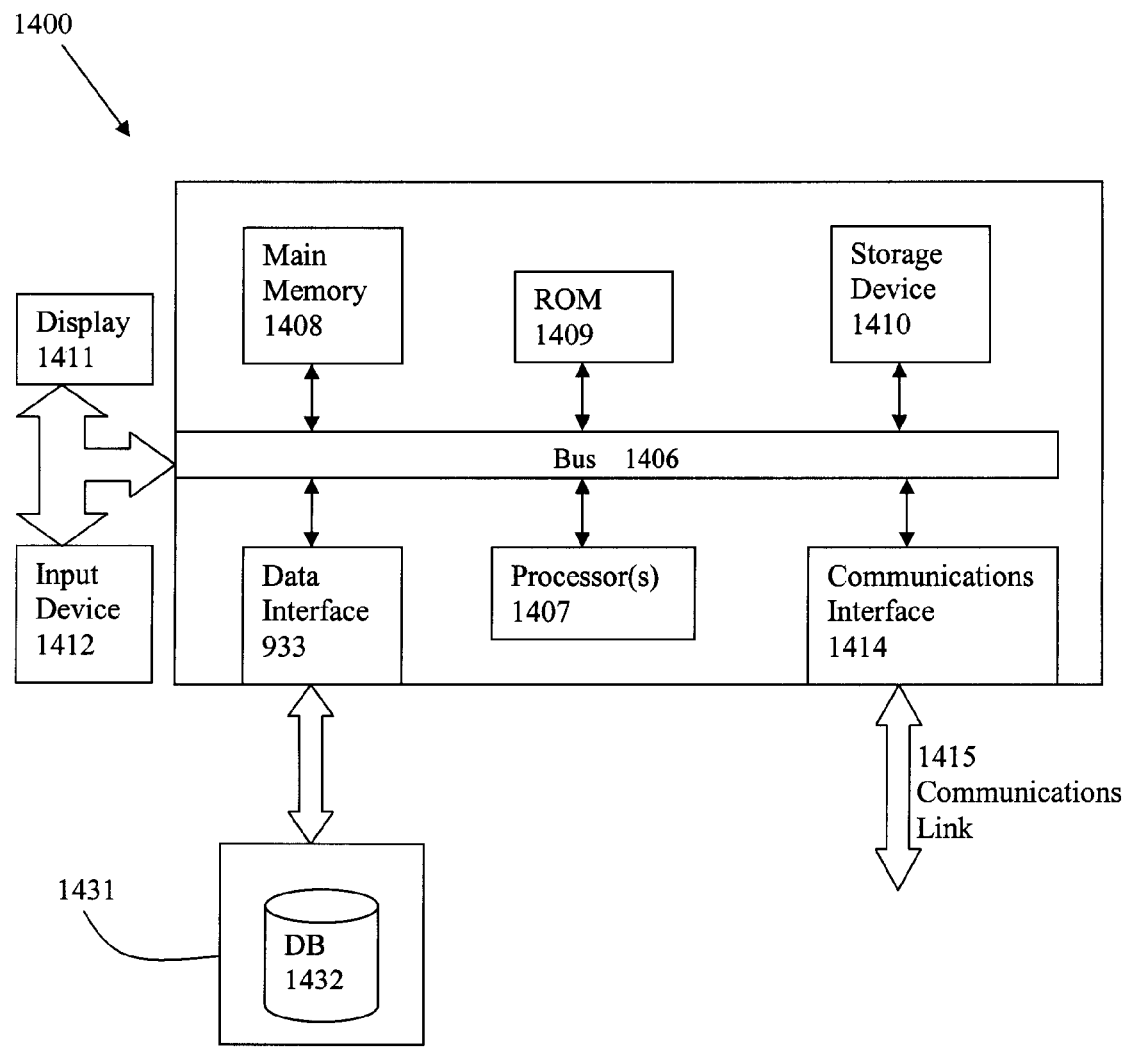
FIG. 9 depicts a computerized system on which a method for implementing external domain independent modeling framework can be implemented.

FIG. 9 is a block diagram of an illustrative computing system 1400 suitable for implementing an embodiment of the present invention. Computer system 1400 includes a bus 1402 or other communication mechanism for communicating information, which interconnects subsystems and devices, such as processor 1404, system memory 1406 (e.g., RAM), static storage device 1408 (e.g., ROM), disk drive 1410 (e.g., magnetic or optical), communication interface 1412 (e.g., modem or ethernet card), display 1414 (e.g., CRT or LCD), input device 1416 (e.g., keyboard), and cursor control 1418 (e.g., mouse or trackball).

According to one embodiment of the invention, computer system 1400 performs specific operations by processor 1404 executing one or more sequences of one or more instructions contained in system memory 1406. Such instructions may be read into system memory 1406 from another computer readable/usable medium, such as static storage device 1408 or disk drive 1410. In alternative embodiments, hard-wired circuitry may be used in place of or in combination with software instructions to implement the invention.

The term "computer readable medium" or "computer usable medium" as used herein refers to any medium that participates in providing instructions to processor 1404 for execution. Such a medium may take many forms, including but not limited to, non-volatile media, and volatile media. Non-volatile media includes, for example, optical or magnetic disks, such as disk drive 1410. Volatile media includes dynamic memory, such as system memory 1406.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1420 (e.g., LAN, PTSN, or wireless network) may perform the sequence of instructions required to practice the invention in coordination with one another.

Computer system 1400 may transmit and receive messages, data, and instructions, including program, i.e., application code, through communication link 1420 and communication interface 1412. Received program code may be executed by processor 1404 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing external domain independent modeling framework in a system design, comprising:
    using at least one processor to perform a process, the process comprising:
    importing a first external model of an electronic circuit design in a first external format into an internal common modeling framework, in which
        the action of importing the first external model further comprises preserving some or all interpretation of the first external model, and
        the computer implemented method requires no compliance on an external tool on which the first external model is constructed; and
    determining a first internal common representation for the first external model within the internal common modeling framework, in which the act of determining the first internal common representation comprises:
        representing the first external model in an intermediate representation of the electronic circuit design; and
        compiling the intermediate representation into the first internal common representation based at least in part upon a result of synchronizing the intermediate representation within the internal common modeling framework, wherein the first internal common representation represents the first external model in a common manner.

2. The computer implemented method of claim 1, further comprising:
    validating accuracy of the first internal common representation within the internal common modeling framework.

3. The computer implemented method of claim 1, further comprising:
determining an analysis or transformation capability for the internal common modeling framework.

4. The computer implemented method of claim 3, further comprising:
performing the analysis or transformation capability of the internal common modeling framework on the first internal common representation within the internal common modeling framework.

5. The computer implemented method of claim 1, further comprising:
updating the internal common modeling framework to include the first internal common representation for the first external model.

6. The computer implemented method of claim 1, in which the process further comprises:
identifying the first external model in the first external format;
identifying a first set of semantics rules according to the first external format; and
compiling the first external model in the first external format according to the first set of semantics rules.

7. The computer implemented method of claim 6, in which the first set of semantics rules is identified from a repository which comprises a plurality of sets of semantics rules for compiling external models in a plurality of external formats.

8. The computer implemented method of claim 6, in which the process further comprises:
representing the first external model in the intermediate representation within the internal common modeling framework while preserving the some or all interpretation of the first external model in the intermediate representation; and
representing the intermediate representation in the first internal common representation by compiling the intermediate representation.

9. The computer implemented method of claim 8, the process further comprising:
synchronizing the intermediate representation within the internal common modeling framework.

10. The computer implemented method of claim 8, in which the action of compiling the intermediate representation is performed by an imperative programming language, an object oriented programming language, or a dynamic programming language.

11. The computer implemented method of claim 8, in which the first internal common representation executes, simulates, emulates, or analyzes in an identical manner within the internal common modeling framework as does the intermediate representation in the internal common modeling framework.

12. The computer implemented method of claim 1, further comprising:
outputting a first output model of the first internal common representation in a second external format.

13. The computer implemented method of claim 12, in which the action of outputting the first output model is performed in a manner to preserve some or all interpretation of the internal common representation.

14. The computer implemented method of claim 12, in which the second external format is a domain specific format.

15. The computer implemented method of claim 13, in which respective semantics or respective interpretation of the first external model, respective semantics or respective interpretation of the first internal common representation, and respective semantics or respective interpretation of the first output model are identical.

16. The computer implemented method of claim 1, in which the action of preserving the some or all interpretation comprises:
causing an external model and an internal representation of the external model within the internal common modeling framework to execute, simulate, emulate, or analyze in an identical manner.

17. The computer implemented method of claim 1, in which the internal common representation executes, simulates, or analyzes in an identical manner within the internal common modeling framework as does the first external model in a respective first external domain.

18. The computer implemented method of claim 1, in which the intermediate representation executes, simulates, or analyzes in an identical manner within the internal common modeling framework as does the first external model in a respective first external domain.

19. The computer implemented method of claim 1, in which the internal common modeling framework interprets all external models, each of which represents a part of the system design, in an identical manner regardless of their respective external domains or respective external sources.

20. The computer implemented method of claim 1, in which the process further comprises representing all external models in a common manner regardless of an external source or an external format of the all external models.

21. The computer implemented method of claim 1, in which the internal common modeling framework represents all external models of the system design in a common manner.

22. The computer implemented method of claim 21, in which the process further comprises representing all external models of the system design in a common manner regardless of one or more external sources or one or more external formats of the all external models.

23. The computer implemented method of claim 1, in which a portion of the method is implemented as embedded software.

24. A system for implementing external domain independent modeling framework in a system design, comprising:
at least one processor that is to:
import a first external model of an electronic circuit design in a first external format into an internal common modeling framework, in which
the at least one processor that is to import the first external model is further to preserve some or all interpretation of the first external model, and
the system for implementing the external domain independent modeling framework requires no compliance on an external tool on which the first external model is constructed; and
determine a first internal common representation for the first external model within the internal common modeling framework, in which the at least one processor that is to determine the first internal common representation is further to:
represent the first external model in an intermediate representation of the electronic circuit design; and
compile the intermediate representation into the first internal common representation based at least in part upon a result of synchronizing the intermediate representation within the internal common modeling framework, wherein the first internal common representation represents the first external model in a common manner.

25. The system of claim 24, in which the processor is further to:
  validate accuracy of the first internal common representation within the internal common modeling framework,
  determine an analysis or transformation capability for the internal common modeling framework, or
  update the internal common modeling framework to include the first internal common representation for the first external model.

26. The system of claim 25, in which the processor that is to determine an analysis or transformation capability for the internal common modeling framework is further to:
  perform the analysis or transformation capability of the internal common modeling framework on the first internal common representation within the internal common modeling framework.

27. The system of claim 24, in which the at least one processor is further to:
  identify the first external model in the first external format;
  identify a first set of semantics rules according to the first external format; and
  compile the first external model in the first external format according to the first set of semantics rules.

28. The system of claim 27, in which the processor is further to:
  represent the first external model in the intermediate representation within the internal common modeling framework while preserving the some or all interpretation of the first external model in the intermediate representation; and
  represent the intermediate representation in the first internal common representation by compiling the intermediate representation.

29. A computer program product that includes a non-transitory medium usable by a processor, the non-transitory medium having stored thereon a sequence of instructions which, when executed by the processor, causes the processor to execute a process for implementing external domain independent modeling framework in a system design, the process comprising:
  importing a first external model of an electronic circuit design in a first external format into an internal common modeling framework, in which
    the action of importing a first external model further comprises preserving some or all interpretation of the first external model, and
    the process for implementing the external domain independent modeling framework requires no compliance on an external tool on which the first external model is constructed; and
  determining a first internal common representation for the first external model within the internal common modeling framework, in which the process of determining the first internal common representation comprises:
    representing the first external model in an intermediate representation of the electronic circuit design; and
    compiling the intermediate representation into the first internal common representation based at least in part upon a result of synchronizing the intermediate representation within the internal common modeling framework, wherein the first internal common representation represents the first external model in a common manner.

30. The computer program product of claim 29, the process further comprising:
  validating accuracy of the first internal common representation within the internal common modeling framework,
  determining an analysis or transformation capability for the internal common modeling framework, or
  updating the internal common modeling framework to include the first internal common representation for the first external model.

31. The computer program product of claim 29, in which the act of determining the analysis or transformation capability for the internal common modeling framework comprises:
  performing the analysis or transformation capability of the internal common modeling framework on the first internal common representation within the internal common modeling framework.

32. The computer program product of claim 29, in which the process further comprises:
  identifying the first external model in the first external format;
  identifying a first set of semantics rules according to the first external format; and
  compiling the first external model in the first external format according to the first set of semantics rules.

33. The computer program product of claim 32, in which the process further comprises:
  representing the first external model in the intermediate representation within the internal common modeling framework while preserving the some or all interpretation of the first external model in the intermediate representation; and
  representing the intermediate representation in the first internal common representation by compiling the intermediate representation.

* * * * *

UNITED STATES PATENT AND TRADEMARK OFFICE
CERTIFICATE OF CORRECTION

| | | |
|---|---|---|
| PATENT NO. | : 8,352,906 B2 | Page 1 of 1 |
| APPLICATION NO. | : 11/966981 | |
| DATED | : January 8, 2013 | |
| INVENTOR(S) | : Kashai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1374 days.

Signed and Sealed this
Eleventh Day of November, 2014

Michelle K. Lee
*Deputy Director of the United States Patent and Trademark Office*